(12) United States Patent
Kang et al.

(10) Patent No.: US 8,152,366 B2
(45) Date of Patent: Apr. 10, 2012

(54) ESTIMATION OF SUBSURFACE THERMAL STRUCTURE USING SEA SURFACE HEIGHT AND SEA SURFACE TEMPERATURE

(75) Inventors: Yong Q. Kang, Elkton, MD (US);
Young-Heon Jo, Camden, DE (US);
Xiao-Hai Yan, Newark, DE (US)

(73) Assignee: University of Delaware, Newark, DE (US)

(*) Notice: Subject to any disclaimer, the term of this patent is extended or adjusted under 35 U.S.C. 154(b) by 545 days.

(21) Appl. No.: 12/321,559

(22) Filed: Jan. 22, 2009

(65) Prior Publication Data
US 2009/0187369 A1 Jul. 23, 2009

Related U.S. Application Data

(60) Provisional application No. 61/062,027, filed on Jan. 23, 2008.

(51) Int. Cl.
*G01K 13/00* (2006.01)
*G01K 1/00* (2006.01)
*G01K 3/06* (2006.01)

(52) U.S. Cl. ............. 374/136; 702/130; 374/E13.001

(58) Field of Classification Search .......... 374/136, 374/137, E13.001, E13.006; 702/130, 166, 702/FOR. 100, FOR. 142; 73/170.29, 170.31
See application file for complete search history.

(56) References Cited

U.S. PATENT DOCUMENTS

| | | | | |
|---|---|---|---|---|
| 3,968,586 A | * | 7/1976 | Peterson | 43/4.5 |
| 4,123,160 A | * | 10/1978 | Caputo et al. | 356/301 |
| 4,611,929 A | * | 9/1986 | Holyer | 374/124 |
| 4,867,564 A | * | 9/1989 | Sweeney et al. | 356/484 |
| 4,988,885 A | * | 1/1991 | Lindstrom | 250/559.22 |
| 4,997,273 A | * | 3/1991 | Leonard et al. | 356/43 |
| 5,072,540 A | * | 12/1991 | Monzyk et al. | 43/4 |
| 6,380,886 B1 | * | 4/2002 | Jacobs | 342/120 |
| 6,628,569 B1 | * | 9/2003 | Steiner et al. | 367/111 |

(Continued)

FOREIGN PATENT DOCUMENTS
JP 62011120 A * 1/1987

(Continued)

OTHER PUBLICATIONS

PCT International Search Report for International Application No. PCT/US/09/31800; Report mailed Mar. 10, 2009.

(Continued)

*Primary Examiner* — R. A. Smith
(74) *Attorney, Agent, or Firm* — RatnerPrestia

(57) ABSTRACT

A method of determining a subsurface temperature in a body of water is disclosed. The method includes obtaining surface temperature anomaly data and surface height anomaly data of the body of water for a region of interest, and also obtaining subsurface temperature anomaly data for the region of interest at a plurality of depths. The method further includes regressing the obtained surface temperature anomaly data and surface height anomaly data for the region of interest with the obtained subsurface temperature anomaly data for the plurality of depths to generate regression coefficients, estimating a subsurface temperature at one or more other depths for the region of interest based on the generated regression coefficients and outputting the estimated subsurface temperature at the one or more other depths. Using the estimated subsurface temperature, signal propagation times and trajectories of marine life in the body of water are determined.

19 Claims, 11 Drawing Sheets
(5 of 11 Drawing Sheet(s) Filed in Color)

U.S. PATENT DOCUMENTS

| | | | |
|---|---|---|---|
| 8,032,314 B2 * | 10/2011 | Barron et al. | 702/50 |
| 2007/0174013 A1 | 7/2007 | Liescheski | |
| 2007/0194980 A1 * | 8/2007 | Mitchell et al. | 342/120 |
| 2008/0008037 A1 | 1/2008 | Welker | |
| 2008/0103695 A1 * | 5/2008 | Whiting | 701/213 |
| 2009/0126254 A1 * | 5/2009 | Yamazaki et al. | 43/4.5 |
| 2009/0299501 A1 * | 12/2009 | Lankinen | 700/56 |
| 2010/0082264 A1 * | 4/2010 | Barron et al. | 702/25 |

FOREIGN PATENT DOCUMENTS

| | | | |
|---|---|---|---|
| JP | 2000298069 A | * | 10/2000 |
| JP | 2006038722 A | * | 2/2006 |
| JP | 2007257297 A | * | 10/2007 |
| KR | 2007089896 A | * | 9/2007 |

OTHER PUBLICATIONS

Martin Fischer; *Multivariate Projection of Ocean Surface Data Onto Subsurface Sections*; Geophysical Research Letters; Mar. 15, 2000; pp. 755-757; vol. 27, No. 6; American Geophysical Union; Washington, DC.

L-L. Fu (edited by); *Report of the 2007 OSTST Meeting*; Executive Summary; Mar. 12-15, 2007; pp. 1-28; Holbart, Australia.

Paolo Cipollini, et al.; *Remote Sensing of Oceanic Rossby Wave: New Techniques and Results*; Geoscience and Remote Sensing Symosium; Jul. 24, 2000; pp. 1824-1826; vol. 5; Honolulu, HI.

Kimio Hanawa et al.; *Reexamination of the Depth Error in XBT Data*; Journal of Atmospheric and Oceanic Technology; Jun. 1991; pp. 422-429; vol. 8, Issue 3; American Meteorological Society.

John Gilson, et al.; *Relationship of TOPEX/Poseidon Altimetric Height to Steric Height and Circulation in the North Pacific*; Journal of Geophysical Research; Nov. 15, 1998; pp. 27,947-27,965; vol. 103, No. C12; American Geophysical Union; Washington DC.

Mary Cait McCarthy, et al.; *Seasonal to Interannual Variability From Expendable Bathythermograph and TOPEX/Poseidon Altimeter Data in the South Pacific Subtropical Gyre*; Journal of Geophysical Research; Aug. 15, 2000; pp. 19,535-19,550; vol. 105, No. C8; American Geophysical Union; Washington DC.

Edward Khedouri, et al.; *Potential Oceanographic Applications of Satellite Altimetry for Inferring Subsurface Thermal Structure*; Oceans; Aug. 2008; pp. 274-280; vol. 15; IEEE.

Melissa M. Bowen, et al.; *Wind-Driven and Steric Fluctuations of Sea Surface Height in the Southwest Pacific*; Geophysical Research Letters; Jul. 29, 2006; pp. 1-4; vol. 33; No. 14; American Geophysical Union; Washington DC.

Introduction_godas_web; National Weather Service Climate Prediction Center; Mar. 1, 2006; 7 Pages; Published on Web at http://www.cpc.ncep.noaa.gov/products/GODAS/pl/introduction_godas_web.pdf.

Matthew S. Jones, et al.; *Correlations Between Altimetric Sea Surface Height and Radiometric Sea Surface Temperature in the South Atlantic*; Journal of Geophysical Research; Apr. 15, 1998; pp. 8073-8087; vol. 103, No. C4; American Geophysical Union; Washington DC.

M. M. Ali et al.; *Estimation of Ocean Subsurface Thermal Structure From Surface Parameters: A Neural Network Approach*; Geophysical Research Letters, Oct. 22, 2004; pp. 1-4; vol. 31; American Geophysical Union. Washington, D.C.

Peter C. Chu et al.; *Determination of Vertical Thermal Structure From Sea Surface Temperature*; Journal of Atmospheric and Oceanic Technology; Jul. 2000; pp. 971-979; vol. 17; Issue 7; American Meteorological Society; Washington, D.C.

Paolo Cipollini et al.; *Rossby Waves Detected in Global Ocean Colour Data*; Geophysical Research Letters; Jan. 15, 2001; pp. 323-326; vol. 28; No. 2; American Geophysical Union Washington, D.C.

Lyman et al.; *Distinct 17- and 33-Day Tropical Instability Waves in Subsurface Observations*; Journal of Physical Oceanography, Apr. 2007; pp. 855-872; vol. 37; Issue 4; American Meteorological Society, Washington, D.C.

Dennis A. Mayer et al.: *Transition Regions and Their Role in the Relationship Between Sea Surface Height and Subsurface Temperature Structure in the Atlantic Ocean*; Geophysical Research Letters; Oct. 15, 2001; pp. 3943-3946; vol. 28; No. 20; American Geophysical Union; Washington, D.C.

Cara Wilson; *A Global View of Bio-Physical Coupling From SeaWiFS and TOPEX Satellite Data*, 1997-2001; Geophysical Research Letters; Apr. 30, 2002; pp. 98-1-98-4 vol. 29; No. 8; American Geophysical Union; Washington, D.C.

Murtugudde et al.; *Remote Sensing of the Indo-Pacific Region: Ocean Colour, Sea Level, Winds and Sea Surface Temperatures*; International Journal of Remote Sensing; Apr. 1, 2004; pp. 1423-1435; vol. 25; Issue 7; Taylor & Francis Ltd.

Cara Wilson et al.; *Correlations Between Surface Chlorophyll and Sea Surface Height in the Tropical Pacific During the 1997-1999 El Niño-Southern Oscillation Event*; Journal of Geophysical Research; Dec. 2001; pp. 31,175-31,188; vol. 106, No. C12; American Geophysical Union; Washington, D.C.

Kenneth S. Casey et al.; *Sea Surface Temperature and Sea Surface Height Variability in the North Pacific Ocean From 1993-1999*; Journal of Geophysical Research; Aug. 7, 2002; pp. 14-1-14-12; vol. 107, No. C8; American Geophysical Union; Washington, D.C.

Peter D. Killworth et al., *Physical and Biological Mechanisms for Planetary Waves Observed in Satellite-Derived Chlorophyll*; Journal of Geophysical Research; Aug. 2003;; vol. 109; Issue C7; Amerian Geophysical Union, Washington, D.C.

Derya Birant et al.; *Cluster Analysis for Physical Oceanographic Data and Oceanographic Surveys in Turkish Seas*; Journal of Marine Research; 2006; pp. 651-668; vol. 64; No. 5; Sears Foundation for Marine Research.

D. Swain et al.; *Estimation of Mixed-Layer Depth From Surface Parameters*; Journal of Marine Research; 2006; pp. 745-758; vol. 64; No. 5; Sears Foundation for Marine Research.

Shoichi Kizu et al.; *Recorder-Dependent Temperature Error of Expendable Bathythermograph*; Journal of Oceanography; 2002; pp. 469-476; vol. 58; Springer Netherlands.

Robert E. Cheney et al.; *Mesoscale Variability Between New York and Bermuda From Repeated XBT Sections and Satellite Altimetry*; Journal of Physical Oceanography; Mar. 1985; pp. 252-257; vol. 15; Issue 3; American Meteorological Society.

Kathryn A. Kelly et al.; *Monitoring Gulf Stream Transport by Radar Altimeter and Inverted Echo Sounders*; Journal of Physical Oceanography; May 1994; pp. 1080-1084; vol. 24; American Meteorological Society.

Eric W. Leuliette et al.; *Coupled Pattern Analysis of Sea Surface Temperature and TOPEX/Poseidon Sea Surface Height*; Journal of Physical Oceanography; Apr. 1999; pp. 599-611; vol. 29; American Meteorological Society.

Frédéric Vivier et al.; *Heat Budget in the Kuroshio Extension Region*:1993-1999; Journal of Physical Oceanography; 2002; pp. 1-23; American Meteorological Society.

Tal Ezer et al.; *Continuous Assimilation of Geosat Altimeter Data Into a Three-Dimensional Primitive Equation Gulf Stream Model*; Journal of Physical Oceanography; Apr. 1994; pp. 832-847; vol. 24; American Meteorological Society.

Masayoshi Ishii et al.; *Historical Ocean Subsurface Temperature Analysis With Error Estimates*; Monthly Weather Review; Jan. 2003; pp. 51-73; vol. 131; American Meteorological Society.

David A. Siegel; *The Rossby Rototiller*; Nature International Weekly Journal of Science; Feb. 2001; pp. 576-577; vol. 409; Nature Publishing Group.

B. Mete Uz et al; *Pumping of Nutrients to Ocean Surface Waters by the Action of Propagating Planetary Waves*; Nature International Weekly Journal of Science; Feb. 2001; pp. 597-600; vol. 409; Nature Publishing Group.

Ablain et al.; *2007 Ocean Surface Topography Science Team Meeting*; Mar. 12-15, 2007; pp. 1-193; Wrest Point, Hobart, Tasmania, Australia.

D. Roemmich et at.; *Combined Studies of Altimetric and Subsurface Data*; Scripps; Institution of Oceanography; Aviso Newsletter #8; Oct. 2001; pp. 1-3; published on web at www.Aviso.cnes.fr:8090/Html/Information/Publication/News/News8/roemmich_uk.html.

Chen et al, "Speed of Sound in Seawater At High Pressures," Journal of the Acoustical Society of America; vol. 62; Nov. 1977; pp. 1129-1135.

Global Ocean in 2006-2007; Climate Prediction Center, NCEP, published on web at http://www.cpc.ncep.noaa.gov/products/GODAS/ocean_briefing_gif/ocean_brief_annual_2007.ppt; Feb. 8, 2008; pp. 1-22.

* cited by examiner

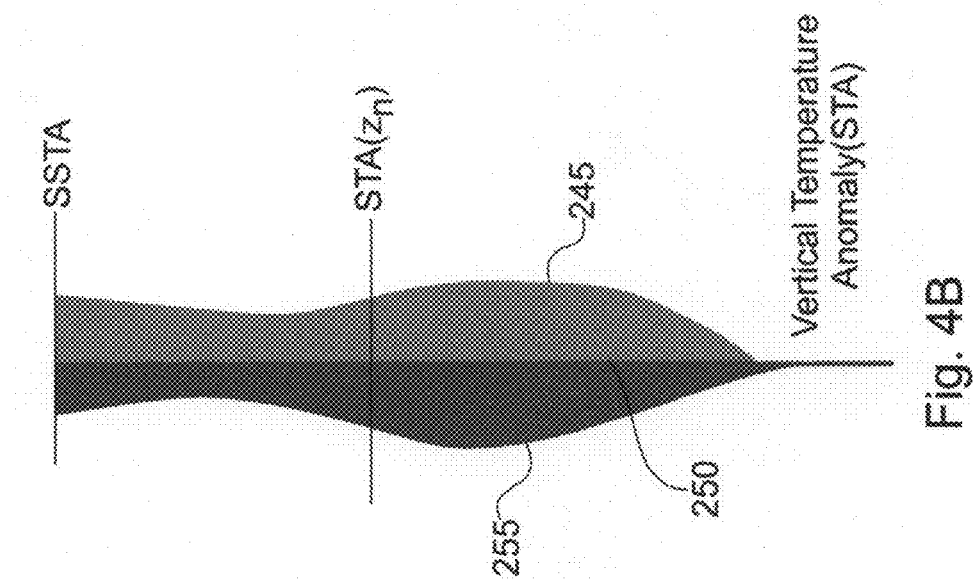
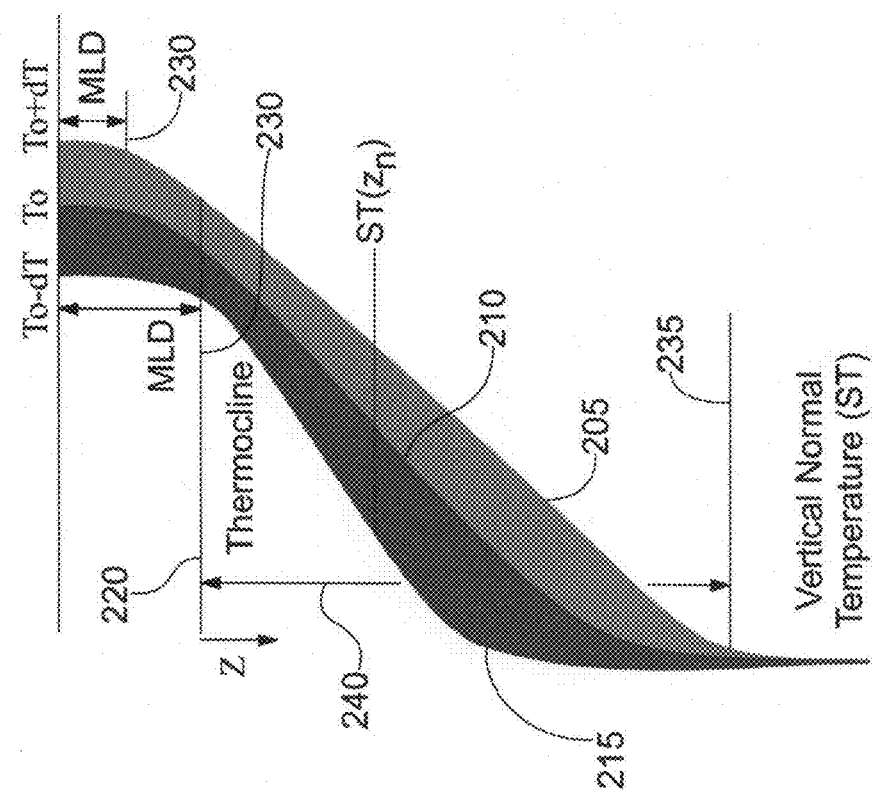
Fig. 4A
Fig. 4B

ESTIMATION OF SUBSURFACE THERMAL STRUCTURE USING SEA SURFACE HEIGHT AND SEA SURFACE TEMPERATURE

CROSS REFERENCE TO RELATED APPLICATIONS

This application claims the benefit of U.S. Provisional Application No. 61/062,027,filed Jan. 23, 2008,the contents of which are herein incorporated by reference.

GOVERNMENT FUNDING

The U.S. Government has a paid-up license in the present invention and the right in limited circumstances to require the patent owner to license others on reasonable terms as provided for by contract as awarded by the National Aeronautics and Space Administration under funding number NASA Space Grant (NNG05G092H).

FIELD OF THE INVENTION

The present invention relates to estimating subsurface thermal structures and, more particularly, to methods and systems for improved estimation of subsurface temperatures.

BACKGROUND OF THE INVENTION

Subsurface thermal information is useful in determining the trajectories of fish in open-ocean fisheries and in detecting ocean acoustic signals. Such information is also useful for weather predictions and ocean dynamics analysis. Presently, subsurface thermal information may be obtained from in-situ measurements using devices such as thermal monitors and may be extrapolated using numerical modeling through assimilations.

SUMMARY OF THE INVENTION

The invention Is embodied in a method of determining a subsurface temperature in a body of water. The method includes obtaining surface temperature anomaly data and surface height anomaly data of the body of water for a region of interest, and also obtaining subsurface temperature anomaly data for the region of interest at a plurality of depths. The method further includes regressing the obtained surface temperature anomaly data and surface height anomaly data for the region of interest with the obtained subsurface temperature anomaly data for the plurality of depths to generate regression coefficients, estimating a subsurface temperature at one or more other depths for the region of interest based on the generated regression coefficients and outputting the estimated subsurface temperature at the one or more other depths.

The invention is also embodied in a method of determining a propagation time of a signal along a propagation path in a body of water. The method includes calculating surface locations and depths in the body of water associated with the propagation path of the signal, obtaining surface temperature anomaly data and surface height anomaly data of the body of water corresponding to the calculated surface locations associated with the propagation path of the signal and estimating subsurface temperatures along the propagation path at a propagation depth based on at least the obtained surface temperature anomaly data and surface height anomaly data. The method further includes calculating the propagation time of the signal along the propagation path based on the estimated subsurface temperatures and outputting the calculated propagation time.

The invention is also embodied in a method of determining trajectories of marine life in a body of water. The method includes determining a geographic region of interest of the body of water where the marine life is located, obtaining surface temperature anomaly data and surface height anomaly data of the body of water for the region of interest and estimating a plurality of vertical subsurface temperature gradients in the region of interest based on at least the obtained surface temperature anomaly data and surface height anomaly data. The method further includes determining a plurality of depths for a thermocline in the region of interest, each of the plurality of depths for the thermocline being associated with a respectively different one of the plurality of estimated vertical subsurface temperature gradients and displaying at least the thermocline in the region of interest to establish one or more trajectories of the marine life in the region of interest.

BRIEF DESCRIPTION OF THE DRAWINGS

The patent or application file contains at least one drawing executed in color. Copies of this patent or patent application publication with colored drawing(s) will be provided by the Patent and Trademark Office upon request and payment of the necessary fee.

The invention is best understood from the following detailed description in connection with the accompanying drawings, with like elements having the same reference numerals. According to common practice, the various features of the drawings are not drawn to scale. On the contrary, the dimensions of various features are arbitrarily expanding or reduced for clarity. The letter n may be used to refer to a non-specific number of elements. Included in the drawings are the following figures:

FIGS. 4A and 4B are color graphs illustrating a typical vertical normal temperature profile (gradient) and a typical vertical temperature anomaly profile (gradient) for a body of water;

DETAILED DESCRIPTION OF THE INVENTION

Exemplary embodiments of the present invention may be used to estimate subsurface thermal structures of a body of water from readily available surface measurements such as Sea Surface Height and Sea Surface Temperature.

Figure 1:
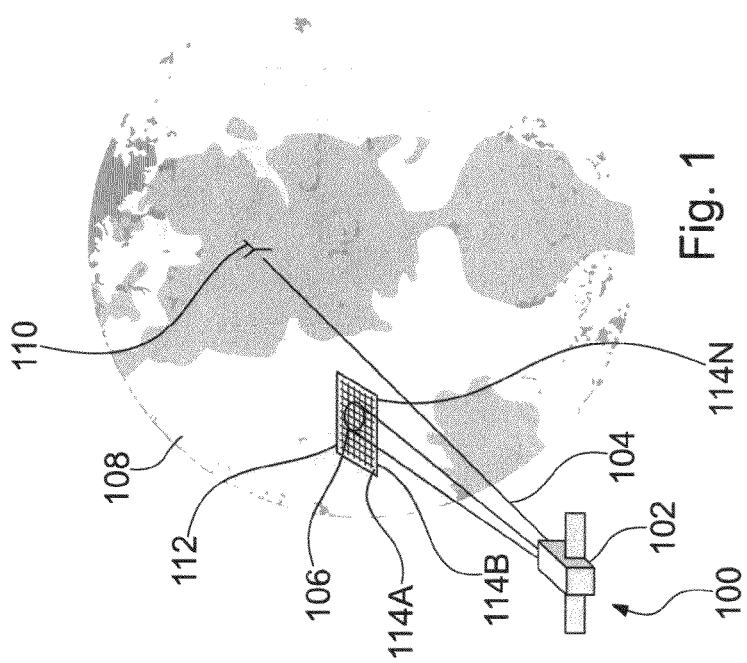
FIG. 1 is a schematic drawing illustrating a satellite measurement system in accordance with an exemplary embodiment of the invention.

FIG. 1 is a schematic drawing illustrating a satellite measurement system in accordance with an exemplary embodiment of the invention.

Referring now to FIG. 1, satellite measurement system 100 includes a satellite 102 for observing a planetary surface (e.g., bodies of water) 108. Satellite 102 may have measurement equipment for obtaining measurements from the planetary surface 108 within a field of view 106. For example, this measurement equipment may be the National Centers for Environmental Predictions (NCEP) Global Ocean Data Assimilation System (GODAS) platform. Satellite 102 also may include communication link 104 for transmitting measured data regarding the bodies of water (e.g., SSH and SST data, among others) to a control station 110 for ease of obtaining and interpreting the measured data. Planetary surface 108 may be segmented into geographic regions 112 (e.g., regions of interest) that each include a plurality of locations (represented by locations 114A-114N).

Figure 2:
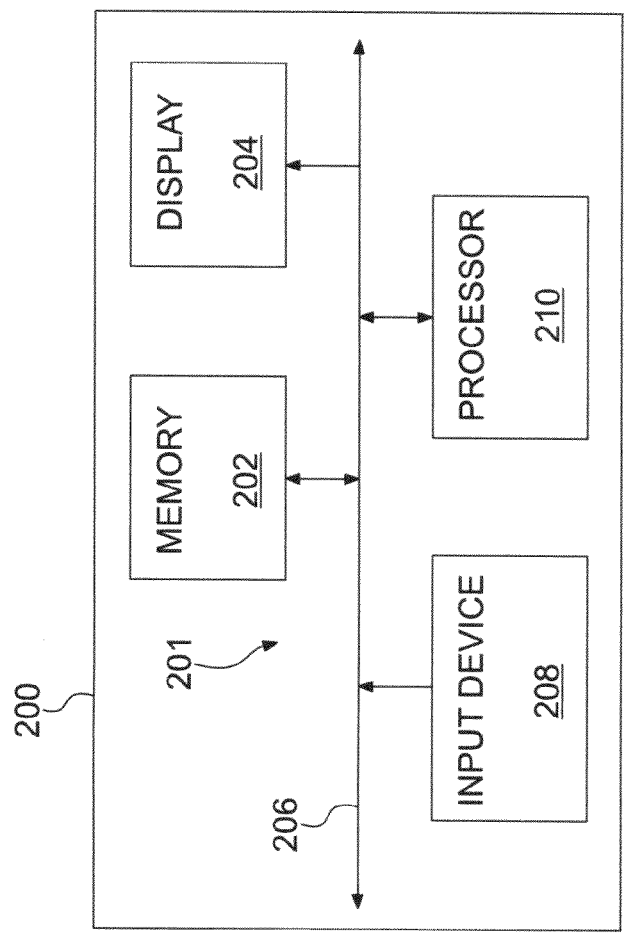
FIG. 2 is a block diagram illustrating a computer architecture in accordance with another exemplary embodiment of the invention.

FIG. 2 is a block diagram illustrating a computer architecture 200 in accordance with an exemplary embodiment of the invention. Computer architecture 200 may include a computer 201 that has a memory 202 for storing information, display 204 for displaying information, an input device 208 for receiving information, and a processor 210 for processing information. Computer 201 also may include a communication link 206 that enables processor 210 to access memory 202, receive input from input device 208, and display information on display 204. Computer 201 may receive information including, for example, SSH and SST data from satellite 102 (FIG. 1) via communication links 104 and 206 for processing by processor 210 and/or storage in memory 202. Input device 208 may be any standard computer input device such as a keyboard or CD-ROM. Further, communication link 206 may be connected to additional devices such as a local area network (not shown).

Figure 3A:
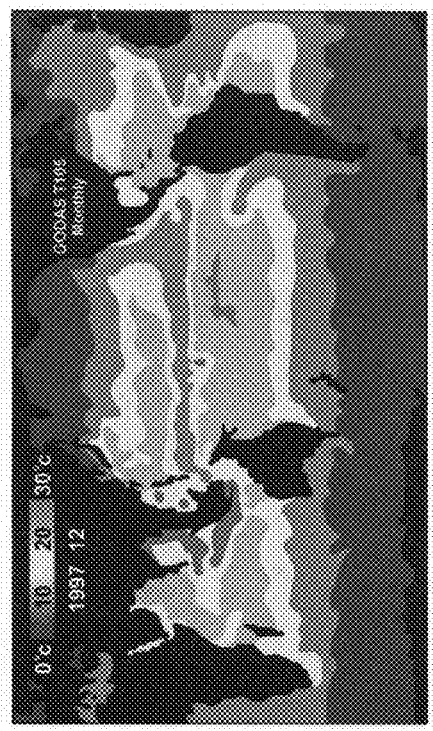
FIGS. 3A and 3B are color images illustrating monthly Sea Surface Height (SSH) data and Sea Surface Temperature (SST) data, respectively.
Figure 3B:
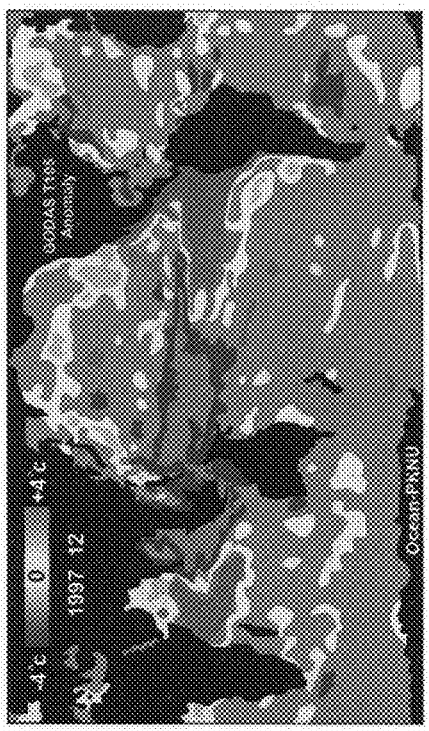
Figure 3C:
FIGS. 3C and 3D are color images illustrating SSH anomaly (SSHA) data and SST anomaly (SSTA) data, respectively.
Figure 3D:
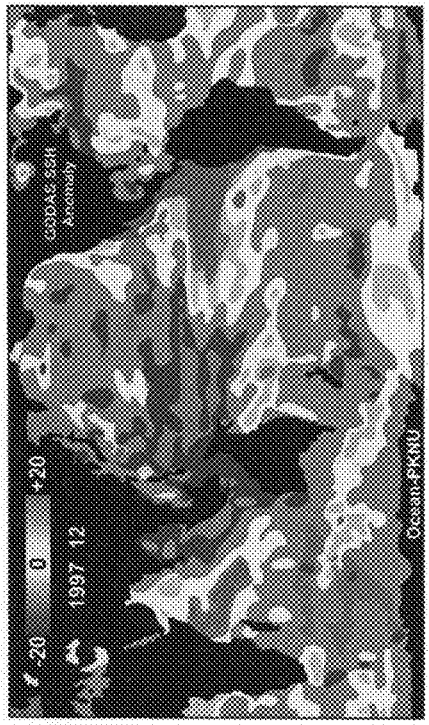

FIGS. 3A and 3B are color images illustrating monthly SSH data and SST data, respectively. FIGS. 3C and 3D are color images illustrating SSHA data and SSTA data, respectively.

FIG. 3A shows monthly mean SSH data for the period of December, 1997 from the GODAS platform. The monthly mean SSH data corresponds to locations between latitudes 75° S and 65° N with a resolution of 1° by 1° enhanced to 1/3° in the north/south direction within 10° of the equator. Terrestrial portions (land masses) are shown in black for FIG. 3A and each subsequent color image derived from GODAS data (i.e., FIGS. 3A-3D, 5A-5D and 6). In FIG. 3A, shades of red indicate regions where monthly mean SSH is about one meter above climatological (normal) height and shades of purple indicate regions where monthly mean SSH is about 2 meters lower than climatological height.

FIG. 3B shows SST data in the same month and with the same coverage area as FIG. 3A. In FIG. 3B, shades of red indicate regions where SST is about 30° C. and shades of purple indicate regions where SST is about 0° C.

FIG. 3C shows SSHA for the period of December, 1997 from the same coverage area as FIGS. 3A and 3B. In FIG. 3C, shades of red indicate regions where SSHA is about +20 centimeters and shades of purple indicate regions where SSHA is about −20 centimeters. The SSHA data is derived from the difference between the actual SSH and the monthly mean SSH data.

FIG. 3D shows subsurface temperature anomaly (STA) data from December, 1997 for the same coverage area as FIGS. 3A-3C. These subsurface temperatures are measured/observed temperatures at a depth of 105 meters. The STA data of FIG. 3D is derived from the difference between the actual subsurface temperature and the climatology subsurface temperate at the depth of 105 meters. That is, FIG. 3D shows the difference between the actual subsurface temperature and the climatological subsurface temperature at a depth of 105 m. In FIG. 3D, shades of red indicate regions where actual subsurface temperatures are about 4° C. above the climatological subsurface temperatures and shades of purple indicate regions where actual subsurface temperatures are about 4° below the climatological subsurface temperatures.

The inventors have observed that limited similarities exist between the monthly mean SSH data in FIG. 3A and the SST data in FIG. 3B. The inventors have further observed that there are similar spatial features between the SSHA data of FIG. 3C and the STA data of FIG. 3D at a depth of 105 meters.

FIGS. 4A and 4B are color graphs illustrating a typical vertical normal temperature profile (gradient) and a typical vertical temperature anomaly profile (gradient).

As shown in FIG. 4A, region 205 indicated by red corresponds to heat from the atmosphere that is absorbed by a body of water and region 215 indicated by blue corresponds to heat that is lost from the body of water to the atmosphere. Due to seasonal variation, a Mixed Layer Depth (MLD) 230 may change such that, for example, MLD 230 may be shallower in the summer than in the winter. Line 210 separating region 205 and 215 represents an average temperature anomaly profile, with region 205 representing the positive variation about the mean profile 210 and region 215 representing the negative variation about the mean profile 210. Average temperature anomaly profile 210 varies (decreases with depth) and in time periods for which the atmospheric temperatures are in excess of normal climatological conditions, the vertical temperature profile (or gradient) may tend toward region 205. Moreover, during periods for which atmospheric conditions are below normal (e.g., normal climatological conditions) the vertical temperature profile may tend toward region 215.

FIG. 4B includes a vertical temperature profile similar to that of FIG. 4A with the exception that the climatological subsurface temperatures are subtracted (i.e., the average temperature anomaly profile 210 is removed) to generate line 250 and regions 245 and 255. The subsurface temperature (ST) and the subsurface temperature anomaly (STA) are shown in FIGS. 4A and 4B as $ST(z_n)$ and $STA(z_n)$, respectively, where $z_n$ is the depth. There may be a depth dependant relationship between $SSHA(z_n)$ and $STA(z_n)$ because the vertical displacement in upper thermocline depth 220 (the starting depth of thermocline 240) may lead to changes in the vertical temperature profile and changes in SSH. Maximum correlation may be at depths deeper than MLD 230. Thermocline 240 separates warmer surface water from cold deep water and may be identified by a rapid temperature decrease at depths below upper thermocline depth 220.

The inventors have observed that there is a high correlation between SSTA and STA from the surface of a body of water to MLD 230 due to this layer being well mixed and that there is a high correlation between SSHA and STA from MLD 230 to lower thermocline depth 235.

Figure 5A:
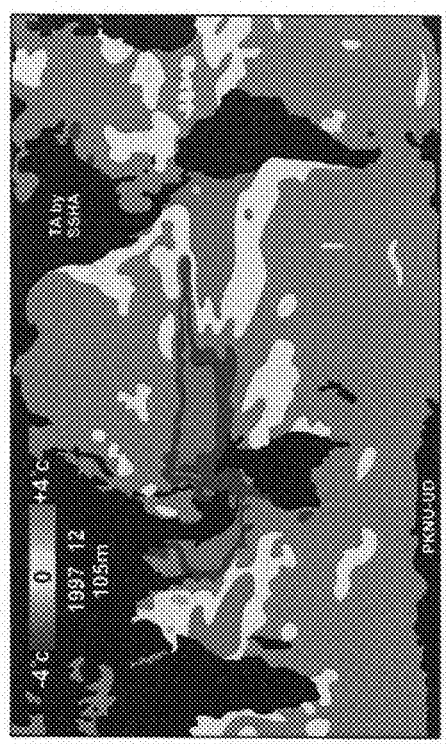
FIGS. 5A, 5B and 5C are color images illustrating predictions (estimates) of subsurface temperature based on SSTA data, SSHA data and a combination of SSHA data and SSTA data.
Figure 5B:
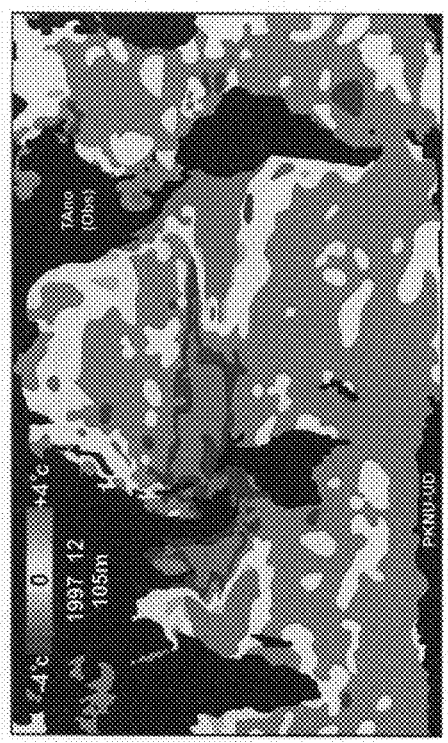
Figure 5C:
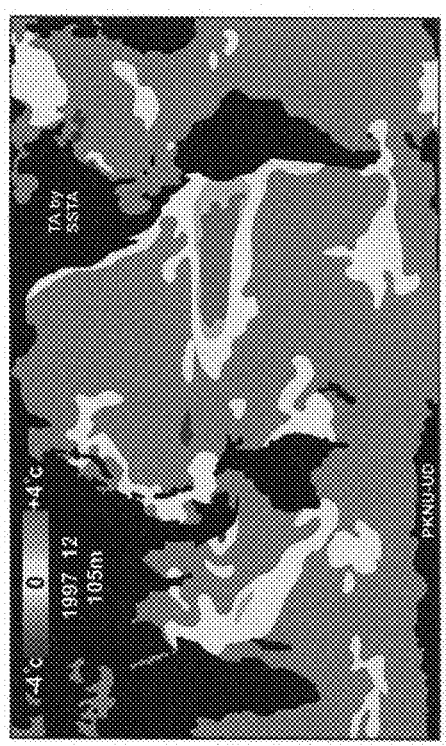
Figure 5D:
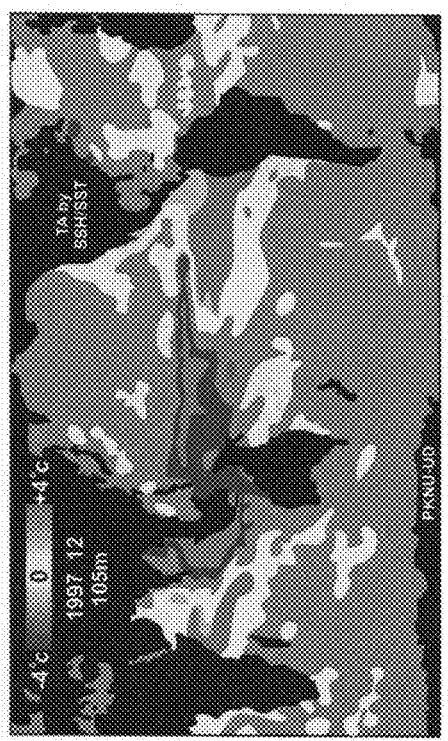
FIG. 5D is a color image illustrating observed (actual) subsurface temperature anomaly (STA) data.

FIGS. 5A, 5B and 5C are color images illustrating predictions (estimates) of subsurface temperatures based on SSTA data, SSHA data and the combination of SSHA data and SSTA data, respectively. FIG. 5D is a color image illustrating observed (actual) STA data.

FIGS. 5A, 5B and 5C are predicted (estimated) STA data at a depth of 105 meters during the period of December 1997. In each of FIGS. 5A-5C red shading indicates regions where subsurface temperatures at the depth of 105 meters are in excess of the climatological subsurface temperature at the same depth by about 4° C. Moreover, purple shading indicates regions where subsurface temperatures at the depth of 105 meters are lower than climatological subsurface temperatures at the same depth by about 4° C.

FIG. 5A shows the predicted STA at 105 m depth based on the STA data alone, FIG. 5B shows the predicted STA at 105 m depth based on SSHA alone and FIG. 5C shows the predicted STA at 105 m depth based on a combination of SSTA and SSHA.

FIG. 5D shows the actual (observed) STA at the depth of 105 meters during the same period (i.e., December, 1997). The Inventors note the spatial similarities between the SSHA data and the actual (observed) STA at the depth of 105 meters.

Figure 6:
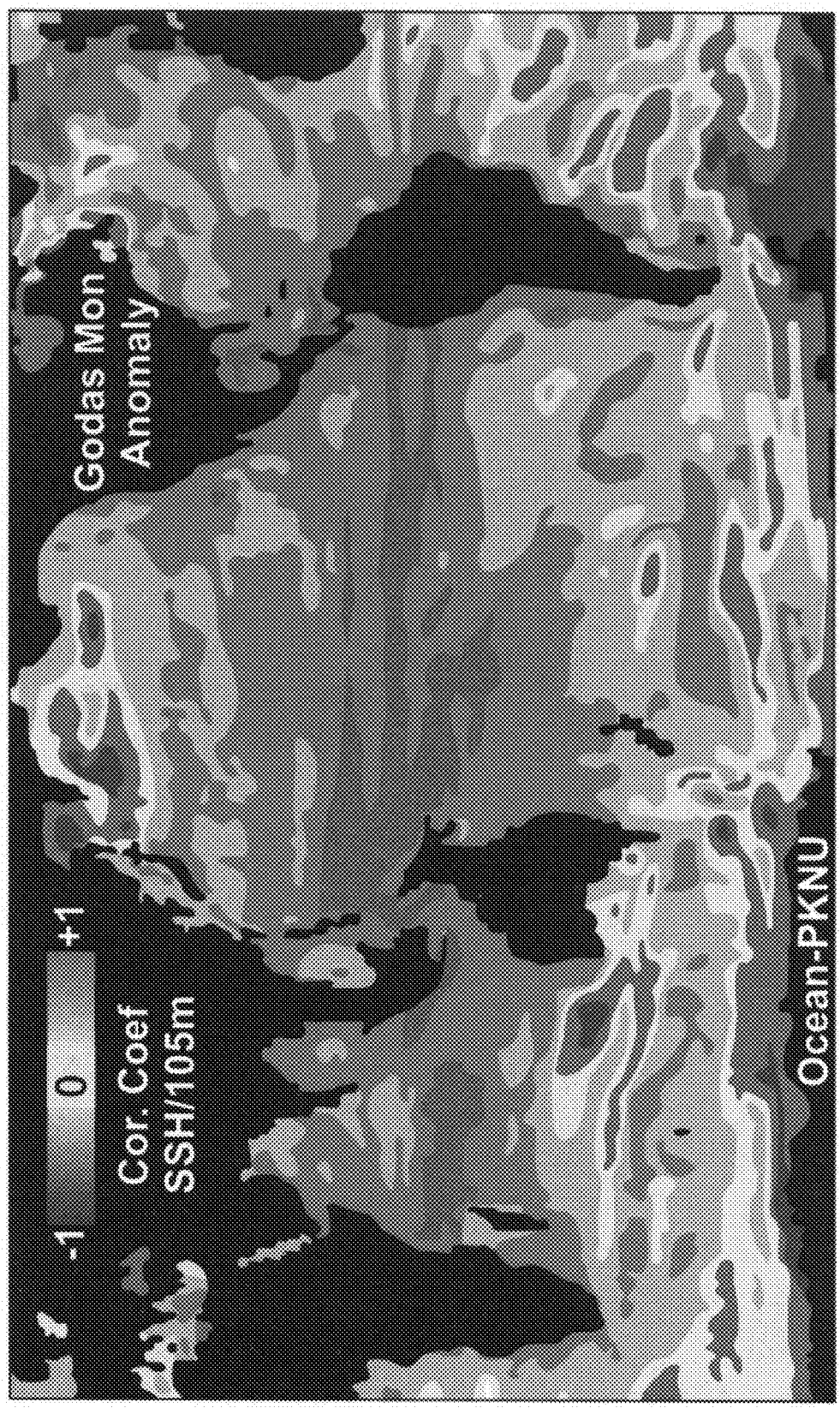
FIG. 6 is a color image illustrating a correlation coefficient between mean SSHA data and observed STA data.

FIG. 6 is a color image illustrating correlation coefficients between monthly mean SSHA data and observed STA data. Values of the correlation coefficients between monthly mean SSHA and STA at the depth of 105 meters are shown. The monthly mean SSHA data and STA data are taken from January 1998 to December 2006. In FIG. 6, red shading indicates regions where the correlation coefficient is about 1 and purple shading indicates regions where the correlation coefficient is about −1. A large portion of the color image is highly correlated with the exception of higher latitudes. The relationship between SSHA and STA at a specified depth depends on, for example, the location of the geographic region of interest 112 and the season. For example, at a 200 m depth, the correlation between SSHA and STA is higher at high latitudes and lower near the equator.

Figure 7:
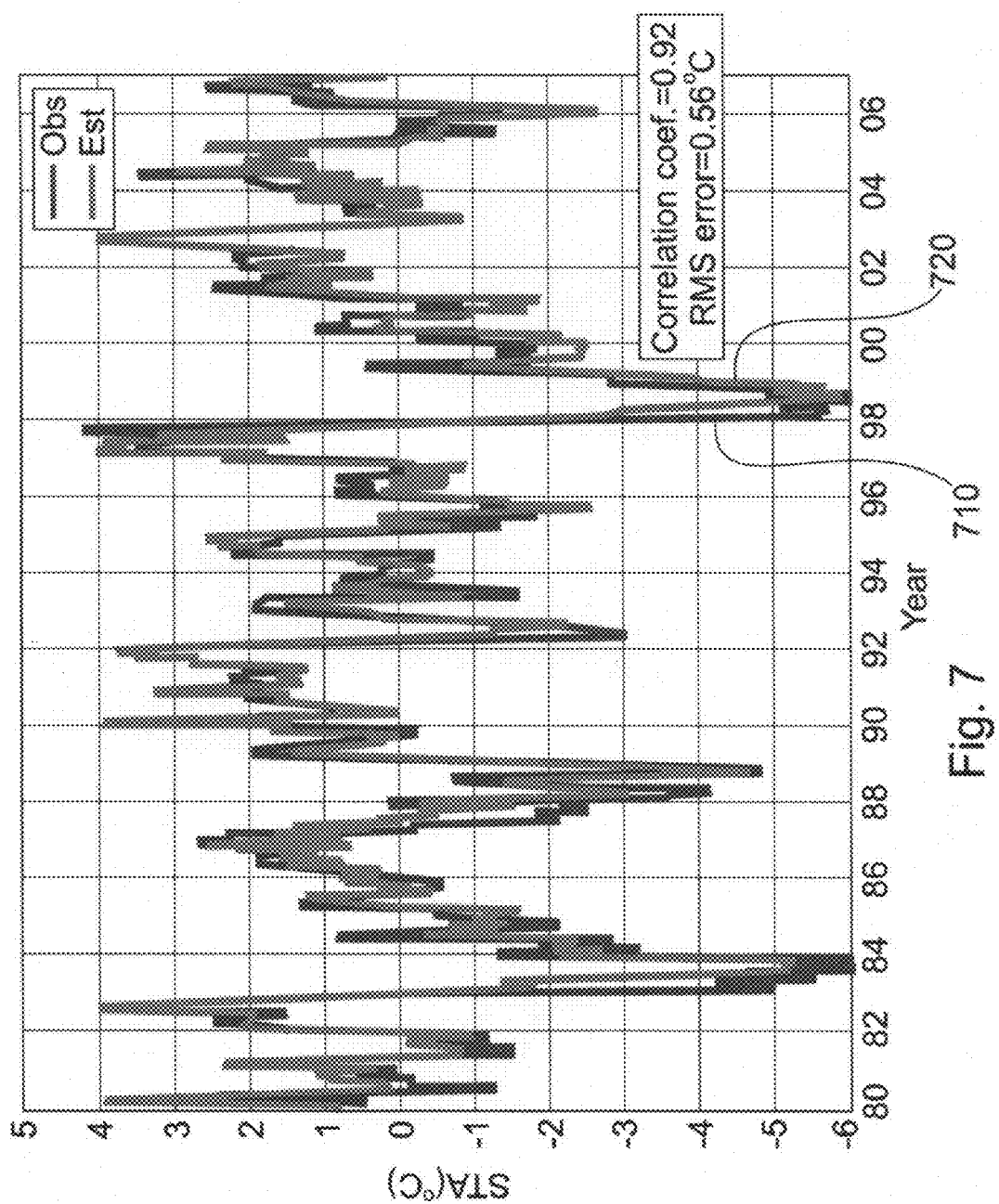
FIG. 7 is a graph illustrating a correlation between estimated STA data and observed STA data for a specific region of interest over an extended timeframe.

FIG. 7 is a color graph 700 illustrating a correlation between estimated STA data and observed STA data for a specific geographic region of interest over an extended timeframe. Color graph 700 shows the observed STA data 710 at the depth of 105 meters at a specified location (i.e., 0° N and 160° W) and the estimated STA data 720 at the same depth and location as the observed STA data 710. The observed and estimated STA data had been collected from January, 1980 to December, 2006. The correlation coefficient between the observed and estimated STA data is 0.92 for that timeframe with an RMS error of 0.56° C. Further, the correlation between SSHA data and STA data at 0 m, 50 m, 100 m, 150 m, 200 m, and 300 m is 0.68, 0.85, 0.90, 0.78, 0.50 and 0.10, respectively. These correlations are taken from the same location as those of FIG. 7 with a correlation between SSHA data and STA data of about 0.80 in a range of about 50 m to 200 m in depth.

Bilinear regression may be used to derive regression coefficients a, b and c for SSTA and SSHA to estimate STA. Equation 1, which is a function of both SSTA and SSHA, may be used to define STA.

$$STA(z,t) = a(z)SSHA(t) + b(z)SSTA(t) + c(z) \tag{1}$$

A least square method (LSM) may be used to calculate regression coefficients a, b, and c in Equation 1 for a best fit between STA(z,t) and a combination of SSHA(t) and SSTA(t) where t is the measurement period and z is the depth. The LSM may determine regression coefficients a, b and c for each region of interest 112 (see FIG. 1) to estimate STA at any depth for region of interest 112. Applying LSM to Equation 1 generates Equation 2 in which regression coefficients a, b and c may be determined by minimizing function E(z).

$$E(z) = \sum_{t=1}^{n} [a(z) * SSHA(t) + b(z) * SSTA(t) + c(z) - STA(z,t)]^2 \tag{2}$$

where n and z are the measurement period and depth, respectively. That is, regression coefficients a, b, and c may be calculated by the LSM algorithm at each geographic location of a body of water or at respective locations (e.g., regions of interest 112) to estimate in a regional or global area of an ocean, deep sea or river, subsurface thermal structures (e.g., STAs, thermoclines, vertical temperature profiles) as a function of depth, latitude and/or longitude. Estimated STA may be determined by Equation 1 by using the calculated regression coefficients a, b and c and actual measurements of SSHA and SSTA. To solve Equation 2, the following Equations are to be satisfied:

$$\frac{\partial E}{\partial a} = 0, \tag{3}$$
$$\frac{\partial E}{\partial b} = 0,$$
and
$$\frac{\partial E}{\partial c} = 0$$

That is, regression coefficients a, b and c may be calculated as follows:

$$\frac{\partial E}{\partial a} = 2\sum_{t=1}^{n} SSHA(t)[a(SSHA(t) + bSSTA(t) + c - Q(t)] = 0$$

$$\frac{\partial E}{\partial a} = 2\sum_{t=1}^{n} SSTA(t)[a(SSHa(t) + bSSTA(t) + c - Q(t)] = 0$$

$$\frac{\partial E}{\partial a} = 2\sum_{t=1}^{n} [a(SSHA(t) + bSSTA(t) + c - Q(t)] = 0$$

or $$\begin{bmatrix} \sum_{t=1}^{n} SSHA^2(t) & \sum_{t=1}^{n} SSHA(t)T(t) & \sum_{t=1}^{n} SSHA(t) \\ \sum_{t=1}^{n} SSHA(t)T(t) & \sum_{t=1}^{n} SSTA^2(t) & \sum_{t=1}^{n} SSTA(t) \\ \sum_{t=1}^{n} SSHA(t) & \sum_{t=1}^{n} SSTA(t) & \sum_{t=1}^{n} 1 \end{bmatrix}$$

$$\begin{bmatrix} a \\ b \\ c \end{bmatrix} = \begin{bmatrix} \sum_{t=1}^{n} SSHA(t)Q(t) \\ \sum_{t=1}^{n} SSHA(t)SSTA(t) \\ \sum_{t=1}^{n} Q(t) \end{bmatrix}$$

Differences between estimated (or predicted) observed subsurface temperature may be calculated from Equation 4.

$$Pred(\%) = 100 \times \left[1 - \frac{RMS(\text{Error})}{RMS(\text{Anomaly})}\right] \qquad (4)$$

where, $$RMS(x_i) = \sqrt{\frac{1}{n}\sum_{i=1}^{n} x_i}$$

and n is the total number of data points.

Figure 8:
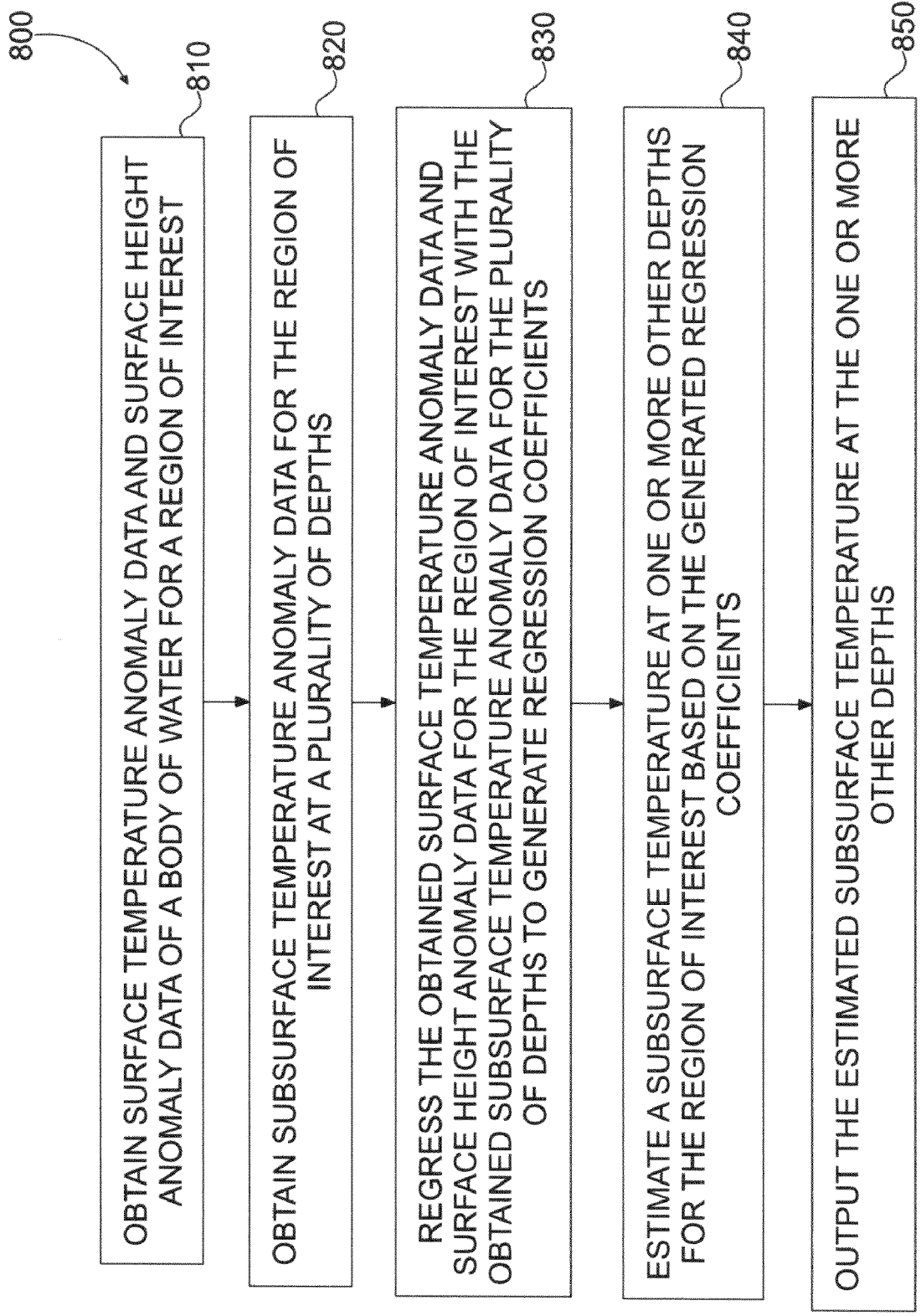
FIG. 8 is a flowchart illustrating a method of determining a subsurface temperature in a body of water in accordance with yet another embodiment of the invention.

FIG. 8 is a flowchart 800 illustrating exemplary steps for determining a subsurface temperature in a body of water in accordance with an embodiment of the invention. To facilitate description, the methods are described with reference to the exemplary satellite measurement system 100 of FIG. 1 and the exemplary computer architecture 200 of FIG. 2. One of skill in the art will understand other suitable systems and/or architectures from the description herein.

At block 810, processor 210 may obtain SSTA data and SSHA data from, for example, satellite 102 via communication links 104 and 206 and the data may be stored in memory 202 or processed in processor 210. The SSTA data and the SSHA data may correspond to region of interest 112 in a body of water on the planetary surface 108. The SSTA data may be derived from the difference between actual surface temperature data and climatological surface temperature data for region of interest 112. The actual and climatological surface temperature data may be based on a time series of the surface temperature data, for example, sampled at specified or predetermined intervals. The SSHA data may be derived from the difference between the actual SSH data and the mean SSH data (e.g., the monthly mean SSH data) and may be based on a time series of the SSH data.

In certain exemplary embodiments, processor 210 may derive the SSTA data and the SSHA data based on a time series for the SST data and for SSH data from satellite 102. Each time series may be sampled at a common or substantially common time interval. Suitable regression techniques will be understood by one of skill in the art from the description herein.

At block 820, processor 210 may receive (obtain) the STA data for the region of interest 112 at a plurality of depths, for example, from in situ measurements taken at region of interest 112. The STA data may be derived from the difference between the actual subsurface temperature data and the mean subsurface climatology temperature at a plurality of specified depths.

In certain exemplary embodiments, processor 210 may derive the obtained STA data for region of interest 112 at the plurality of specified depths from time series subsurface temperature data sampled at the same, common time interval or a substantially common time interval as the SSTA data and/or the SSHA data.

At block 830, processor 210 may regress the obtained SSTA data and SSHA data for region of interest 112 with the corresponding STA data at the plurality of specified depths to generate regression coefficients a, b and c. That is, the actual STA at the plurality of specified depths is obtained and the SSTA data and SSHA data are curve fit to the actual STA to derive the regression coefficients a, b and c.

In certain exemplary embodiments, the regression is a bilinear regression, although other regression techniques may also be possible, for example, non-linear regression techniques. Suitable regression techniques will be understood by one of skill in the art from the description herein.

At block 840, processor 210 may estimate the subsurface temperature at one or more other depths for region of interest 112 based on the generated regression coefficients a, b and c. That is, regression coefficients a, b and c may be used to estimate subsurface temperatures at any depth for region of interest 112. That is, climatological subsurface temperature may be added to the STA calculated using the regression coefficients to generate the estimated subsurface temperature at a particular depth for a specified region of interest.

In certain exemplary embodiments, this range of depths may be between the MDL 230 and lower thermocline depth 235 (FIG. 4A).

In various exemplary embodiments, vertical subsurface temperature gradients for region of interest 112 may be calculated using the generated regression coefficients a, b and c.

In some exemplary embodiments, region of interest 112 may include sub-regions 114A, 114B . . . 114N such that STA data at one or more specified depths may be determined from subsurface temperature data for each respective sub-region 114A, 114B . . . 114N of region of interest 112. The SSTA data and SSHA data associated with each respective sub-region 114A, 114B . . . 114N of region of interest 112 may be regressed with the corresponding STA data to generate a respective set of regression coefficients ($a_1$, $b_1$, $c_1$; $a_2$, $b_2$, $c_2$; . . . $a_n$, $b_n$, $c_n$) associated with each respective sub-region 114A, 114B . . . 114N of region of interest 112. Further, a plurality of vertical subsurface temperature gradients may be calculated based on respective sets of regression coefficients ($a_1$, $b_1$, $c_1$; $a_2$, $b_2$, $c_2$; . . . $a_n$, $b_n$, $c_n$). The determination of STA data at the one or more specified depths for each respective sub-region 114A, 114B . . . 114N of region of interest 112 may include the subsurface temperature data in region of interest 112 being sampled such that the same or different depths are sampled for respective sub-regions 114A, 114B . . . 114N of region of interest 112.

The climatological subsurface temperature may be subtracted from the sampled subsurface temperature data to estimate STA data at the one or more specified depths for each respective sub-region 114A, 114B . . . 114N. For example, if in-situ sampling for one or more of the sub-regions 114A, 114B . . . 114N does not occur, sub-regions 114A, 114B . . . 114N adjacent to the un-sampled sub-regions 114A, 114B ... 114N may be used to interpolate the subsurface temperature data in un-sampled sub-region 114A, 114B ... 114N.

It is contemplated that such interpolation may be based on a linear model, a non-linear model and/or models which account for other factors.

At block 850, the estimated subsurface temperature is output. That is, processor 210, for example, may output the estimated subsurface temperature to a display 204, a printer or other output device.

Sound speed is dependent on temperature and salinity. For example, sound speed changes rapidly in thermocline 240 (FIG. 4A). Estimating thermocline depth in-situ on a large scale (i.e., a global scale) may be difficult due to poor spatial resolution problems. Sound speed, C, may be computed based on the Equation 5.

$$C(S,T,P) = Cw(T,P) + A(T,P,)S + B(T,P)^{3/2} + D(T,P)S^2 \quad (5)$$

where T is temperature, P is pressure and S is salinity. Equation 5 is based on an algorithm by C-T. Chen and F. J. Millero, in a publication entitled "Speed of Sound in Seawater at High Pressures." J Acoust Soc Am, Vol. 62,No. 5,published 1977,at pages 1129-1135. Because of the temperature gradient in thermocline 240, sound speed may rapidly decrease. The negative sound speed gradient may reflect certain signals, for example, active sonar to produce further propagation paths for a propagation signal.

Figure 9:
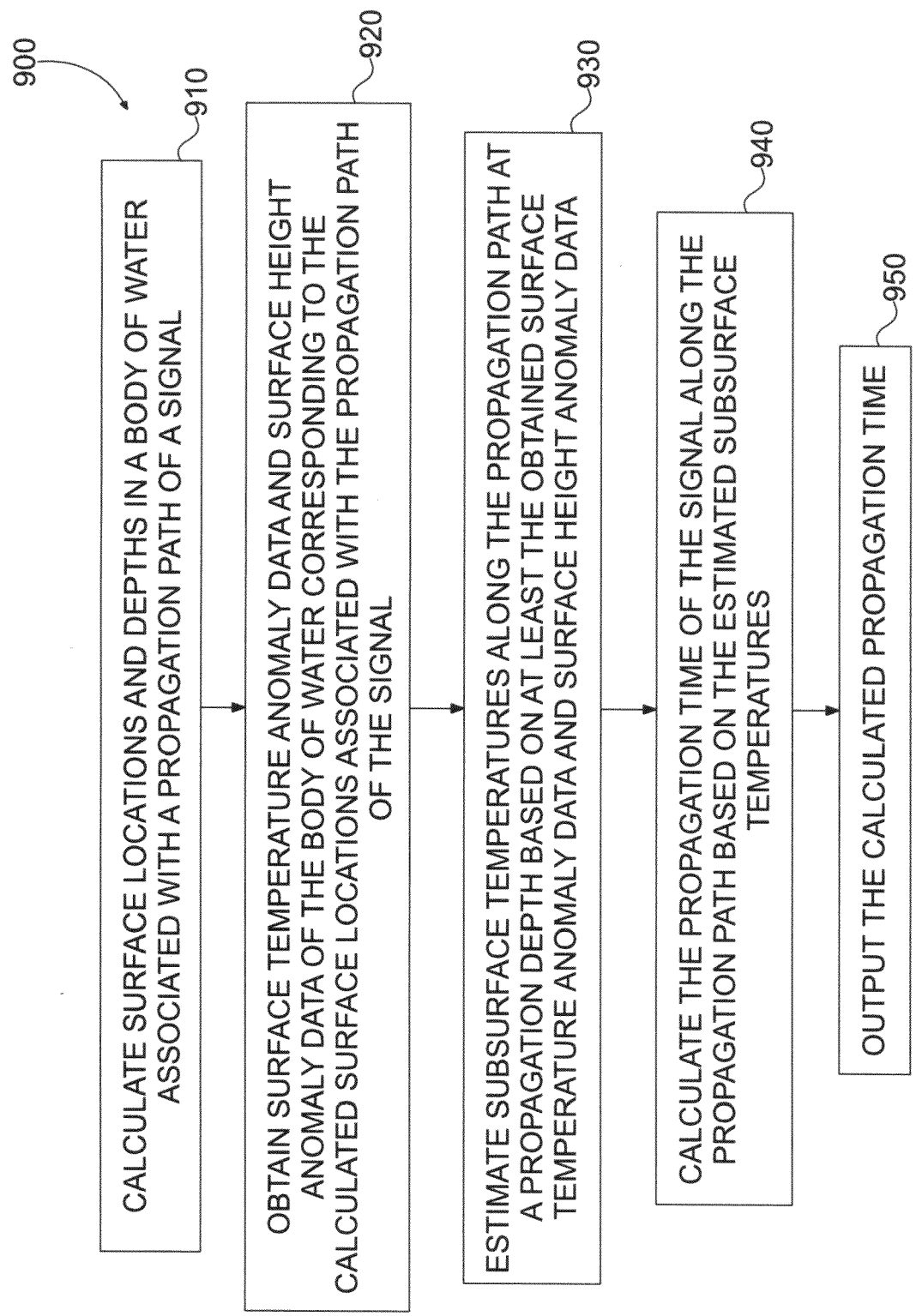
FIG. 9 is a flowchart illustrating a method of determining a propagation time of a signal along a propagation path in a body of water in accordance with yet another exemplary embodiment of the invention.

FIG. 9 is a flowchart 900 illustrating exemplary steps for determining a propagation time of a signal along a propagation path in a body of water in accordance with yet another exemplary embodiment of the invention.

At block 910, processor 210 may calculate surface locations and depths in a body of water (e.g., in an ocean, deep sea, or river) associated with a propagation path of a signal. At block 920, processor 210 may obtain SSHA data and SSTA data from various sources including, for example, data from GODAS and other weather satellite information.

In an exemplary embodiment, processor 210 may also identify locations along the propagation path where the signal may be reflected and may calculate one or more further propagation paths corresponding to locations of the reflected signal. For example, processor 210 may calculate the depth of thermocline 240 (e.g., upper and lower thermocline depths 220 and 235; FIG. 4A) along the propagation path for each respective surface location and may compare the depth of thermocline 240 associated with the respective surface location to the calculated depth of the propagation path at the respective surface location. If the calculated depth of thermocline 240 and the corresponding depth of the propagation path are within a predetermined threshold, the propagation path corresponding to the respective surface location may be indicated as a possible reflection point.

At block 930, processor 210 may estimate subsurface temperatures along the propagation path at the propagation depth based on at least the obtained SSTA data and SSHA data. A description of exemplary steps for estimating subsurface temperatures along the propagations path at the propagation depth is described below with reference to FIG. 10.

At block 940, processor 210 may calculate the propagation time of the signal traversing the propagation path based on the estimated subsurface temperatures. For example, the propagation path may be segmented into propagation path segments and each propagation path segment may have a corresponding estimated subsurface temperature. The propagation time may be calculated by estimating a speed for the signal for each propagation segment based on the subsurface temperature, the pressure which may be estimated based on the depth of the propagation signal and/or the salinity of the body of water at the propagation path segment.

In certain exemplary embodiments, the salinity may be assumed to be a predetermined amount and in other embodiments, actual or estimated salinity data corresponding to each respective propagation segment may be obtained.

At block 950, processor 210 may output the calculated propagation time (e.g., the total composite propagation time for the propagation segment).

In certain exemplary embodiments, display 204 communicates with processor 210, and may display the calculated propagation time with the propagation path and/or the subsurface temperatures along the propagation path. Moreover, in the exemplary embodiments in which further propagation paths are calculated, display 204 may also display the further propagation paths.

Figure 10:
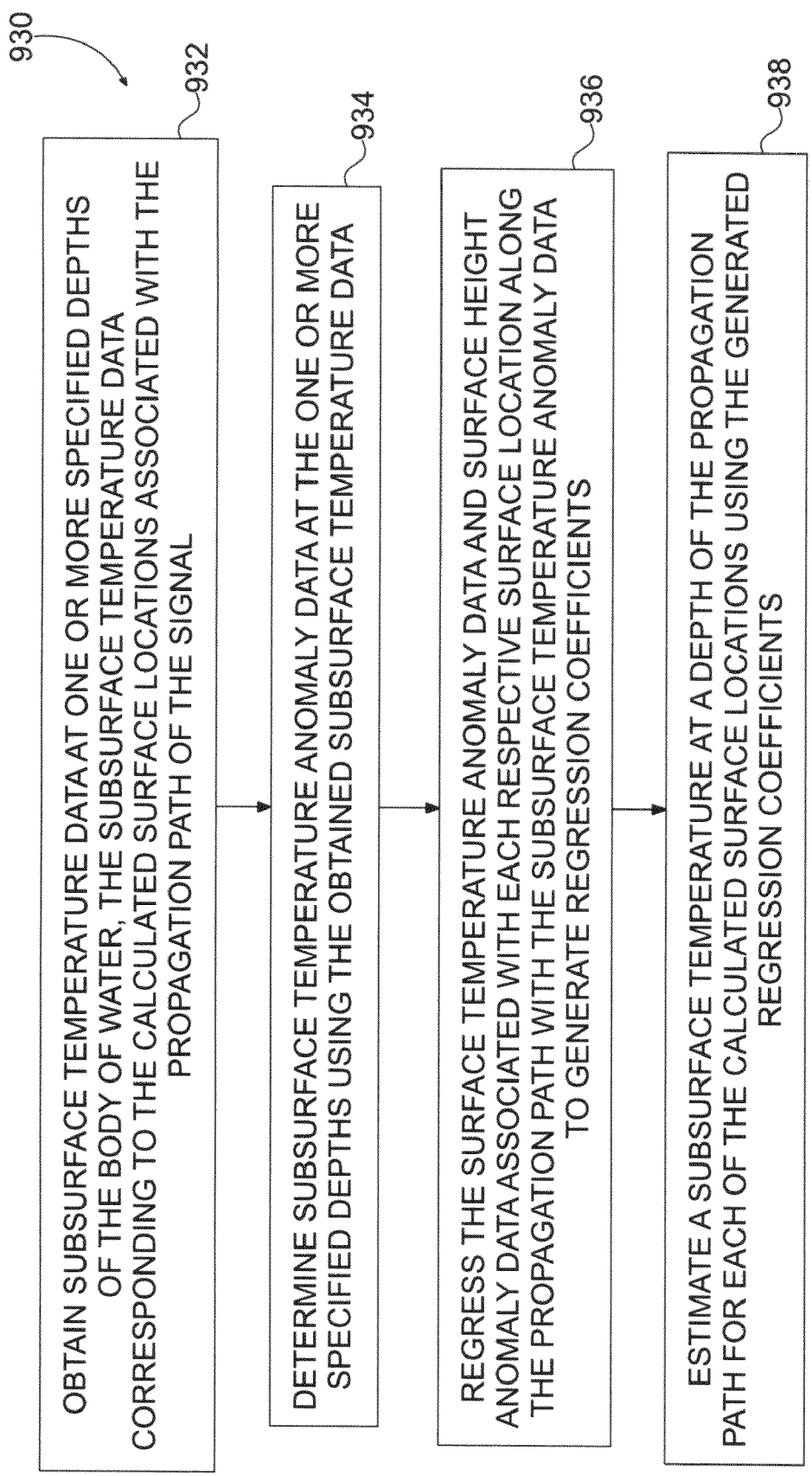
FIG. 10 is a flowchart illustrating an operation of estimating a subsurface temperature along the propagation path for the method of FIG. 9.

FIG. 10 is a flowchart illustrating exemplary steps for estimating a subsurface temperature along the propagation path in block 930 of the method of FIG. 9. Processor 210 may estimate subsurface temperatures along the propagation path by: (1) at block 932, obtaining subsurface temperature data at one or more specified depths in the body of water such that the subsurface temperature data corresponds to the calculated surface locations associated with the propagation path of the signal; (2) at block 934, determining SSTA data at the one or more specified depths using the obtained subsurface temperature data; (3) at block 936, regressing SSTA data and SSHA data associated with each respective surface location along the propagation path with the STA data to generate regression coefficients a, b and c; and (4) at block 938, estimating a subsurface temperature at a depth of the propagation path for each of the calculated surface locations using the generated regression coefficients a, b, and c.

The STA data may be derived from time series subsurface temperature data sampled at the same, common time interval or a substantially common time interval, as the SSTA data and SSHA data. Further, the subsurface temperature data may be sampled for respective locations along the propagation path and the sampled subsurface temperature data may be interpolated to estimate subsurface temperature data at the one or more specified depths for each respective location along the propagation path. The interpolation of the sampled subsurface temperature data may be based on linear or non-linear interpolation techniques.

Figure 11:
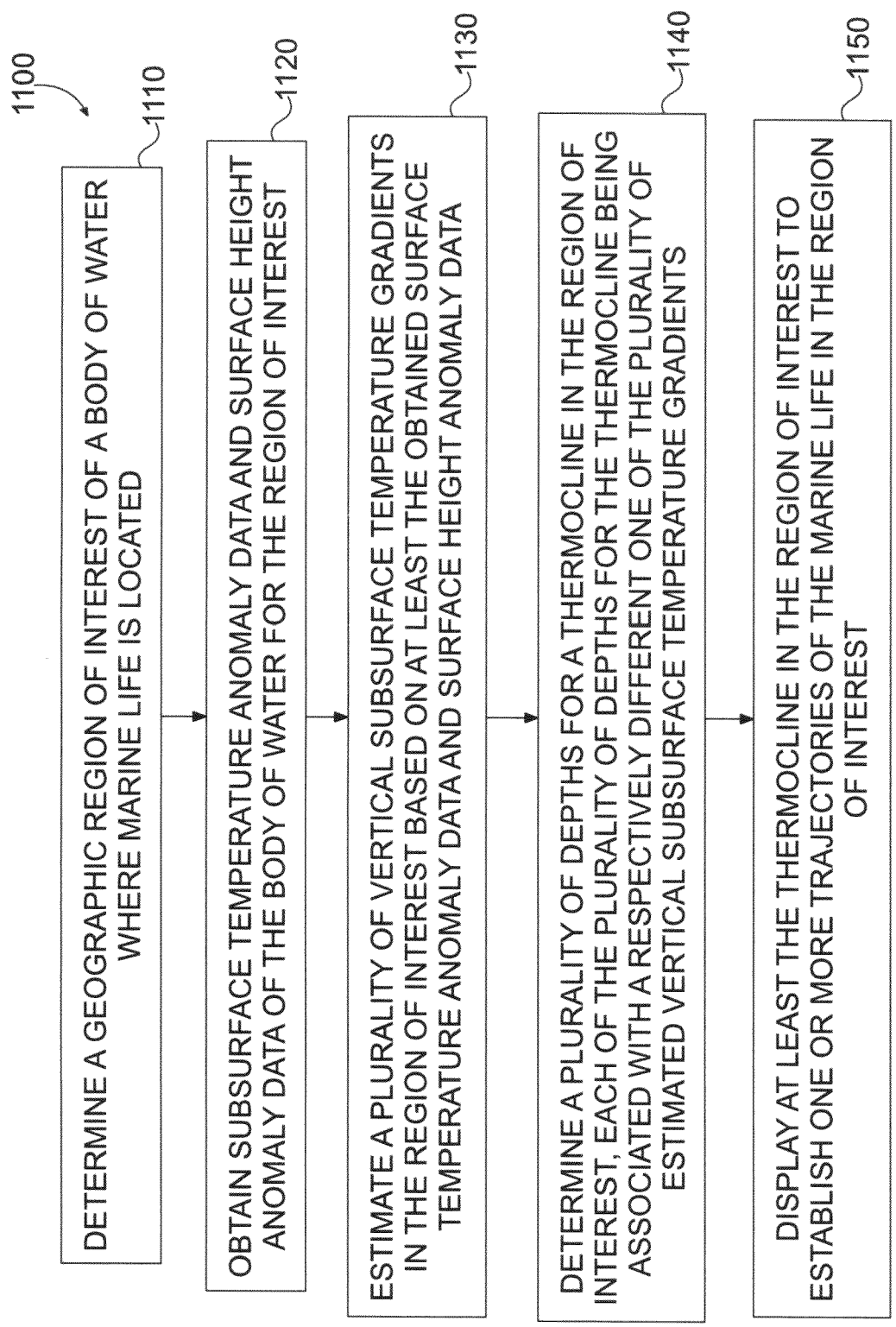
FIG. 11 is a flowchart illustrating a method of determining trajectories of marine life in a body of water in accordance with yet another exemplary embodiment of the invention.

FIG. 11 is a flowchart illustrating exemplary steps for determining trajectories of marine life in a body of water in accordance with yet another exemplary embodiment of the invention.

At block 1110, processor 210 or a user (not shown) may determine a geographic region of interest 112 of the body of water where marine life is located.

Because a vertical surface temperature gradient relates to an average level of light seen by marine organisms, upper thermocline depth 220 (FIG. 4A) may be an indication of a lowest depth that marine life frequently traverse. At depths lower than upper thermocline depth 220, light levels decline rapidly, and, thus, the amount of marine life below this depth may be limited, for example.

At block 1120, processor 210 may obtain via satellite 102 STA data and SSHA data for region of interest 112. At block 1130, processor 210 may estimate a plurality of vertical surface temperature gradients in region of interest 112 based on at least the obtained SSTA data and SSHA data. A description of exemplary steps for estimating the plurality of vertical surface temperature gradients is described below with reference to FIG. 12.

In certain exemplary embodiments, it is contemplated that salinity data and pressure data may be used for the estimation of the plurality of vertical subsurface temperature gradients.

At block 1140, processor 210 may determine variations in the upper and lower depths 220 and 235 for thermocline 240 in accordance with different ones of the plurality of estimated vertical subsurface temperature gradients associated with region of interest 112. That is, thermocline 240 in the region of interest may be mapped by processor 210 such that the changes in thermocline 240 depth (e.g., upper and lower thermocline depth 220 and 235; FIG. 4A) may be calculated and/or displayed. Processor 210 may determine upper and lower thermocline depths 220 and 235 as the depths associated with a rapidly changing vertical subsurface temperature profile (gradient). For example, upper and lower thermocline depths 220 and 235 may be identified based on rapid changes in the slope of the vertical subsurface temperature profile or based on the change in the slope of the vertical subsurface temperature profile that is more than a predetermined threshold.

At block 1150, processor 210 may send to display 204, the information to map/display thermocline 240 for region of interest 112 to establish one or more trajectories of marine life in region of interest 112. That is, thermocline 240 may establish a floor below which marine life generally do not traverse.

In certain exemplary embodiments, thermocline 240, upper thermocline depth 220, and/or lower thermocline depth 235 in region of interest 112 may be displayed along with respective ones of the plurality of estimated vertical subsurface temperature gradients.

Although the determination of trajectories of marine life is based on thermocline 240 in region of interest 112, it is contemplated that various types of marine life are also affected by salinity of the water. Thus, salinity data may also be obtained and mapped/displayed to track/find the trajectories of marine life, such as fish.

Figure 12:
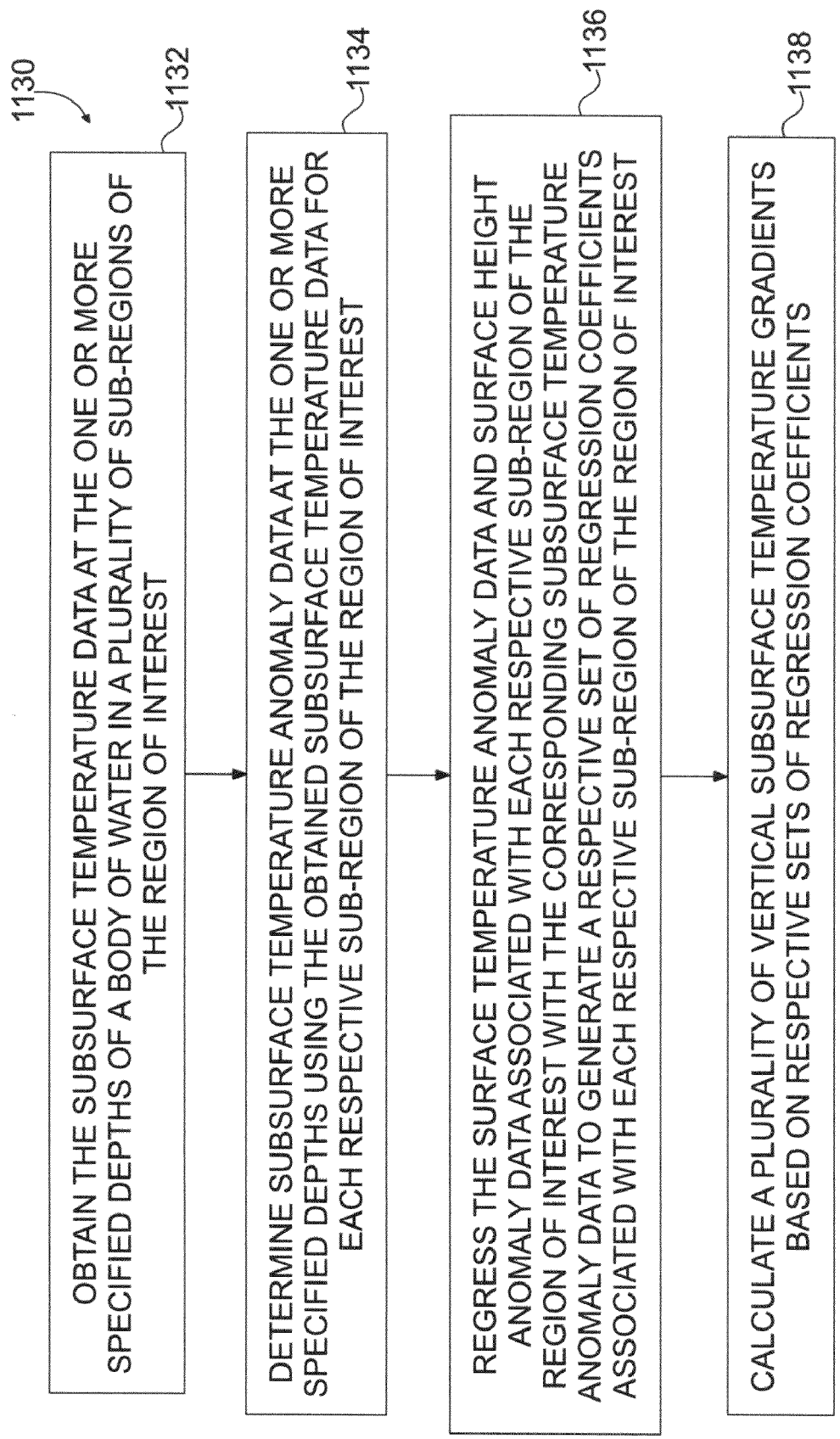
FIG. 12 is a flowchart illustrating an operation of estimating a plurality of subsurface temperature gradients (profiles) in a region of interest for the method of FIG. 11.

FIG. 12 is a flowchart illustrating exemplary steps for estimating a plurality of subsurface temperature gradients (profiles) in a region of interest for step 1130 the method of FIG. 11.

Processor 210 may estimate the plurality of vertical subsurface temperature gradients in region of interest 112 by: (1) at block 1132, obtaining subsurface temperature data at one or more depth in the body of water and a plurality of sub-regions 114A, 114B . . . 114N of region of interest 112; (2) at block 1134, determining SSTA data at the one or more specified depths using the obtained subsurface temperature data for each respective sub-region 114A, 114B . . . 114N of region of interest 112; (3) at block 1136, regressing the SSTA data and SSHA data associated with each respective sub-region 114A, 114B . . . 114N of region of interest 112 with the corresponding SSTA data to generate a respective set of regression coefficients a, b and c associated with respective sub-region 114A, 114B . . . 114N of region of interest 112; and (4) at block 1138, calculating a plurality of vertical subsurface temperature gradients based on respective sets of regression coefficients a, b and c.

It is contemplated that the methods previously described may be carried out within a computer instructed to perform these functions by means of a computer readable medium. Such computer-readable medium include integrated circuits, magnetic storage medium and optical storage medium.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of determining a subsurface temperature in a body of water, the method comprising the steps of:
    obtaining surface temperature anomaly data and surface height anomaly data of the body of water for a region of interest;
    obtaining subsurface temperature anomaly data for the region of interest at a plurality of depths;
    regressing the obtained surface temperature anomaly data and surface height anomaly data for the region of interest with the obtained subsurface temperature anomaly data for the plurality of depths to generate regression coefficients;
    estimating a subsurface temperature at one or more other depths for the region of interest based on the generated regression coefficients; and
    outputting the estimated subsurface temperature at the one or more other depths.

2. The method of claim 1, wherein the step of regressing includes bilinear regressing of the surface temperature anomaly data and surface height anomaly data associated for the region of interest with the obtained subsurface temperature anomaly data for the plurality of depths.

3. The method of claim 1, wherein:
    the step of estimating the subsurface temperature at one or more other depths for the region of interest based on the generated regression coefficients includes calculating a vertical subsurface temperature gradient for the region of interest using the generated regression coefficients; and
    the step of outputting includes:
        mapping respective ones of the plurality of calculated vertical subsurface temperature gradients; and
        identifying, with the mapped ones of the plurality of calculated vertical subsurface temperature gradients, one or more depths associated with a mixed layer and a thermocline layer for the region of interest.

4. The method of claim 1, wherein:
    the step of obtaining the surface temperature anomaly data and the surface height anomaly data of the body of water for the region of interest includes:
        deriving the surface temperature anomaly data and surface height anomaly data of the body of water for the region of interest from time series data sampled at a common time interval; and
    the step of obtaining the subsurface temperature anomaly data for the region of interest at the plurality of depths includes
        deriving the subsurface temperature anomaly data for the region of interest at the plurality of depths from other time series data sampled at the common time interval or a substantially common time interval.

5. The method of claim 1, wherein the step of estimating the subsurface temperature at one or more other depths for the region of interest includes:
    obtaining the subsurface temperature data at the one or more specified depths of the body of water in a plurality of sub-regions of the region of interest;
    determining the subsurface temperature anomaly data at the one or more specified depths using the obtained subsurface temperature data for each respective sub-region of the region of interest;
    regressing the surface temperature anomaly data and surface height anomaly data associated with each respective sub-region of the region of interest with the corresponding subsurface temperature anomaly data to generate a respective set of regression coefficients associated with each respective sub-region of the region of interest; and calculating a plurality of vertical subsurface temperature gradients based on respective sets of regression coefficients.

6. The method of claim 5, wherein the step of determining the subsurface temperature anomaly data at the one or more specified depths using the obtained subsurface temperature data for each respective sub-region of the region of interest includes:

sampling subsurface temperature data in the region of interest such that the same or different depths are sampled for the respective sub-regions of the region of interest; and normalizing the sampled subsurface temperature data to estimate the subsurface temperature data at the one or more specified depths for each respective sub-region.

7. The method of claim 6, wherein the step of normalizing the sampled subsurface temperature data includes linearly interpolating the sampled subsurface temperature data to derive the estimate subsurface temperature data at the one or more specified depths for each respective sub-region.

8. A method of determining a propagation time of a signal along a propagation path in a body of water, comprising the steps of:

calculating surface locations and depths in the body of water associated with the propagation path of the signal;

obtaining surface temperature anomaly data and surface height anomaly data of the body of water corresponding to the calculated surface locations associated with the propagation path of the signal;

estimating subsurface temperatures along the propagation path at a propagation depth based on at least the obtained surface temperature anomaly data and surface height anomaly data;

calculating the propagation time of the signal along the propagation path based on the estimated subsurface temperatures; and outputting the calculated propagation time.

9. The method of claim 8, wherein:

the step of obtaining the surface temperature anomaly data and the surface height anomaly data of the body of water corresponding to the calculated surface locations associated with the propagation path of the signal includes;

deriving the surface temperature anomaly data and surface height anomaly data of the body of water corresponding to the calculated surface locations associated with the propagation path of the signal from time series data sampled at a common time interval; and the step of obtaining the subsurface temperature anomaly data for the region of interest at the plurality of depths includes deriving the subsurface temperature anomaly data corresponding to the calculated surface locations associated with the propagation path of the signal at the plurality of depths from other time series data sampled at the common time interval or a substantially common time interval.

10. The method of claim 8, wherein the step of outputting includes:

displaying the propagation path, the subsurface temperatures along the propagation path and the calculated propagation time.

11. The method of claim 10, wherein:

the step of calculating surface locations and depths in the body of water associated with the propagation path of the signal includes:

identifying locations along the propagation path where the signal is reflected, and calculating one or more further propagation paths corresponding to the locations of the reflected signal; and the step of displaying includes:

displaying, with the propagation path, the one or more further propagation paths.

12. The method of claim 11, wherein the step of identifying locations along the propagation path where the signal is reflected includes:

calculating depths of a thermocline along the propagation path for each respective surface location;

comparing the depth of the thermocline associated with a respective surface location to the calculated depth of the propagation path at the respective surface location;

if the calculated depth of the thermocline associated with the respective surface location and the corresponding depth of the propagation path are within a predetermined threshold, indicating the propagation path corresponding to the respective surface location is indicated as a reflection point.

13. The method of claim 8, wherein the step of estimating the subsurface temperatures along the propagation path includes:

obtaining subsurface temperature data at one or more specified depths of the body of water, the subsurface temperature data corresponding to the calculated surface locations associated with the propagation path of the signal;

determining the subsurface temperature anomaly data at the one or more specified depths using the obtained subsurface temperature data;

regressing the surface temperature anomaly data and surface height anomaly data associated with each respective surface location along the propagation path with the subsurface temperature anomaly data to generate regression coefficients; and estimating a subsurface temperature at a depth of the propagation path for each of the calculated surface locations using the generated regression coefficients.

14. The method of claim 13, wherein the step of regressing includes bilinear regressing of the surface temperature anomaly data and surface height anomaly data associated with the surface location along the propagation path with the respective subsurface temperature anomaly data at the one or more specified depths to generate the regression coefficients.

15. The method of claim 13, wherein the step of obtaining the subsurface temperature anomaly data at the one or more specified depths of the body of water includes:

sampling the subsurface temperature data along the propagation path of the signal such that the same depths are sampled for respective locations along the propagation path; and normalizing the sampled subsurface temperature data to estimate subsurface temperature data at the one or more specified depths for each respective location along the propagation path.

16. The method of claim 15, wherein the step of normalizing the sampled subsurface temperature data includes linearly interpolating the sampled subsurface temperature data to derive the estimate subsurface temperature data at the one or more specified depths for each respective sub-region.

17. A method of determining trajectories of marine life in a body of water, comprising the steps of:
- determining a geographic region of interest of the body of water where the marine life is located;
- obtaining surface temperature anomaly data and surface height anomaly data of the body of water for the region of interest;
- estimating a plurality of vertical subsurface temperature gradients in the region of interest based on at least the obtained surface temperature anomaly data and surface height anomaly data by:
  - obtaining subsurface temperature data at one or more specified depths of the body of water in a plurality of sub-regions of the region of interest,
  - determining subsurface temperature anomaly data at the one or more specified depths using the obtained subsurface temperature data for each respective sub-region of the region of interest,
  - regressing the surface temperature anomaly data and surface height anomaly data associated with each respective sub-region of the region of interest with the corresponding subsurface temperature anomaly data to generate a respective set of regression coefficients associated with each respective sub-region of the region of interest, and
  - calculating the plurality of vertical subsurface temperature gradients based on respective sets of regression coefficients;
- determining a plurality of depths for a thermocline in the region of interest, each of the plurality of depths for the thermocline being associated with a respectively different one of the plurality of estimated vertical subsurface temperature gradients; and
- displaying at least the thermocline in the region of interest to establish one or more trajectories of the marine life in the region of interest.

18. The method of claim 17, wherein the step of displaying the thermocline in the region of interest includes displaying respective ones of the plurality of estimated vertical subsurface temperature gradients with the depths of the thermocline.

19. A non-transitory computer readable medium for storing program code for executing using a computer a method of determining a subsurface temperature in a body of water, the method comprising the steps of:
- obtaining surface temperature anomaly data and surface height anomaly data of the body of water for a region of interest;
- obtaining subsurface temperature anomaly data for the region of interest at a plurality of depths;
- regressing the obtained surface temperature anomaly data and surface height anomaly data for the region of interest with the obtained subsurface temperature anomaly data for the plurality of depths to generate regression coefficients;
- estimating a subsurface temperature at one or more other depths for the region of interest based on the generated regression coefficients; and
- outputting the estimated subsurface temperature at the one or more other depths.

* * * * *